United States Patent
Yim et al.

(10) Patent No.: US 7,931,243 B2
(45) Date of Patent: Apr. 26, 2011

(54) SPEAKER WITH MONITOR MOUNTABLE STAND

(75) Inventors: David Yim, Vancouver, WA (US);
Timothy Leehane, Tigard, OR (US);
Jeffrey Anderson, Camas, WA (US)

(73) Assignee: Logitech Europe S.A., Morges (CH)

( * ) Notice: Subject to any disclaimer, the term of this patent is extended or adjusted under 35 U.S.C. 154(b) by 674 days.

(21) Appl. No.: 11/733,142

(22) Filed: Apr. 9, 2007

(65) Prior Publication Data
US 2008/0035815 A1  Feb. 14, 2008

Related U.S. Application Data

(60) Provisional application No. 60/790,047, filed on Apr. 7, 2006.

(51) Int. Cl.
*E04G 3/00* (2006.01)

(52) U.S. Cl. ............. 248/229.13; 248/231.51; 248/918; 248/316.5

(58) Field of Classification Search ........... 248/918, 248/229.13, 231.51, 229.23, 316.1, 316.5, 248/316.7
See application file for complete search history.

(56) References Cited

U.S. PATENT DOCUMENTS

| | | | | |
|---|---|---|---|---|
| 4,040,547 A * | 8/1977 | Dickey | ........................ | 224/247 |
| 4,526,308 A | 7/1985 | Dovey | | |
| 5,322,255 A | 6/1994 | Garrett | | |
| 5,855,343 A | 1/1999 | Krekelberg | | |
| 6,239,841 B1 * | 5/2001 | Verstockt et al. | ............. | 348/373 |
| 6,431,507 B2 | 8/2002 | Prather et al. | | |
| 6,481,681 B1 | 11/2002 | Stunkel et al. | | |
| 6,663,066 B1 | 12/2003 | Hong | | |
| 6,679,463 B1 | 1/2004 | Chen | | |
| 6,711,006 B2 | 3/2004 | Chen | | |
| 6,738,094 B1 * | 5/2004 | Minami et al. | ................ | 348/373 |
| 7,048,454 B2 * | 5/2006 | Sitoh et al. | .................... | 396/428 |
| 7,066,664 B1 | 6/2006 | Sitoh et al. | | |
| D529,533 S | 10/2006 | Oh et al. | | |
| 7,202,903 B2 | 4/2007 | Lin et al. | | |
| D551,276 S | 9/2007 | Lau | | |
| D555,699 S | 11/2007 | Oh et al. | | |
| D563,452 S | 3/2008 | Tan et al. | | |
| 7,431,253 B2 * | 10/2008 | Yeh | ........................... | 248/286.1 |
| 7,572,073 B2 * | 8/2009 | Kenoyer et al. | ............... | 396/428 |
| 7,618,202 B2 * | 11/2009 | Xiao et al. | ..................... | 396/428 |
| 2006/0170817 A1 * | 8/2006 | Wu | ............................ | 348/373 |
| 2007/0212057 A1 * | 9/2007 | Liang | ............................ | 396/428 |

FOREIGN PATENT DOCUMENTS

CN  3413965  12/2004

(Continued)

*Primary Examiner* — Terrell Mckinnon
*Assistant Examiner* — Steven M Marsh
(74) *Attorney, Agent, or Firm* — Kilpatrick Townsend & Stockton LLP

(57) ABSTRACT

A speaker system with a mount pivotally secured to a speaker frame for detachably securing the speaker system to a display monitor is disclosed. The mount pivots relative to the frame so as to allow the display monitor to be operably received between the mount and frame thereby holding the speaker system in place. A securing structure is preferably provided to hold the mount at a desired position, and resilient padding is preferably provided between the frame, mount and display monitor. The mount can also have a substantially planar bottom surface which allows the speaker system to rest on a desktop simply by positioning the substantially planar bottom surface of the mount on the desktop.

11 Claims, 3 Drawing Sheets

FOREIGN PATENT DOCUMENTS

| | | |
|---|---|---|
| CN | 3413967 | 12/2004 |
| CN | 3439460 | 4/2005 |
| CN | 3442819 | 4/2005 |
| CN | 3504902 | 2/2006 |
| CN | 3510125 | 3/2006 |
| CN | 3593383 | 12/2006 |
| CN | 3605368 | 1/2007 |
| CN | 3631459 | 4/2007 |
| CN | 3640321 | 5/2007 |
| CN | 3652233 | 5/2007 |
| CN | 3676159 | 8/2007 |
| CN | 300689789 | 9/2007 |
| CN | 300752949 | 3/2008 |
| CN | 300757070 | 3/2008 |
| CN | 300759560 | 3/2008 |
| CN | 300785025 | 5/2008 |
| CN | 300844149 | 10/2008 |
| CN | 300850105 | 11/2008 |
| CN | 300853023 | 11/2008 |
| CN | 300873782 | 1/2009 |
| CN | 300887184 | 2/2009 |
| CN | 300900774 | 4/2009 |
| CN | 300920753 | 5/2009 |
| CN | 300928693 | 5/2009 |
| CN | 300947654 | 6/2009 |
| JP | 10-208024 A | 8/1998 |

* cited by examiner

SPEAKER WITH MONITOR MOUNTABLE STAND

CROSS-REFERENCE TO RELATED APPLICATION

The application claims priority to U.S. provisional patent application Ser. No. 60/790,047, filed on Apr. 7, 2006.

FIELD OF THE INVENTION

The present invention relates to a detachable speaker for use primarily with a flat panel monitor and the like. In particular, the speaker has a stand that will allow the speaker to either rest on a substantially flat surface or be detachably secured to the monitor.

BACKGROUND OF THE INVENTION

The use of broadband loudspeaker systems with personal computers is gaining popularity. For example, high fidelity sound is desirable with many multimedia computer applications, such as presentations, games, DVD movies and the like. Moreover, as the applications for using a personal computer expand, the need for high fidelity sound with these applications will also increase.

The typical personal computer rests on a desk, where available space is at a premium. Accordingly, it is desirable for desktop computer components to occupy the smallest footprint possible without compromising computer operation. For example, traditional box-like Cathode Ray Tube ("CRT") computer monitors are being replaced with thinner flat-panel monitors.

It is desirable for the footprint of desktop positioned audio components to be similarly minimized. However, as the fidelity of such speaker systems increases, the overall size of each speaker also tends to increase.

To date, efforts to optimize speaker system fidelity while minimizing the overall desk space occupied for such speakers have had some success. For example, larger audio components, such as sub-woofers and the like, are typically positioned on the floor, with only smaller high frequency satellite speakers resting on the computer desk. More recently, these satellite speakers have included adjustable stands that allow a user to ether rest the speaker on the desk, or mount the speaker to a wall or the like, usually through mounting holes in the stand.

Some manufacturer's of flat panel monitors build speaker systems into the monitors themselves. However, as speaker technology improves and/or as these internally-mounted speakers deteriorate or fail, they cannot be easily replaced without replacing the entire flat panel monitor.

SUMMARY OF THE INVENTION

Accordingly, despite the available desktop computer and the like speaker systems, there remains a need for a speaker system that is not necessarily integral with the monitor, but that maximizes the available desk space to a user. In addition to other benefits that will become apparent in the following disclosure, the present invention fulfills these needs.

A speaker system with a mount pivotally secured to a speaker frame is disclosed. The mount pivots relative to the frame so as to allow an edge of a display monitor to be operably received between the mount and frame thereby holding the speaker system in place on the display monitor. In a disclosed embodiment, a securing structure is disclosed to hold the mount at a desired position, and resilient padding is provided between the frame, mount and display monitor.

If desired, the mount can also have a substantially planar bottom surface to allow the speaker system to rest on a desktop simply by positioning the substantially planar bottom surface of the mount on the desktop of the like.

DETAILED DESCRIPTION OF PREFERRED EMBODIMENTS

A speaker system 10 having a mount 12 for detachably securing a speaker 14 to a flat panel monitor 16 or the like is disclosed in FIGS. 1-4.

Figure 3:
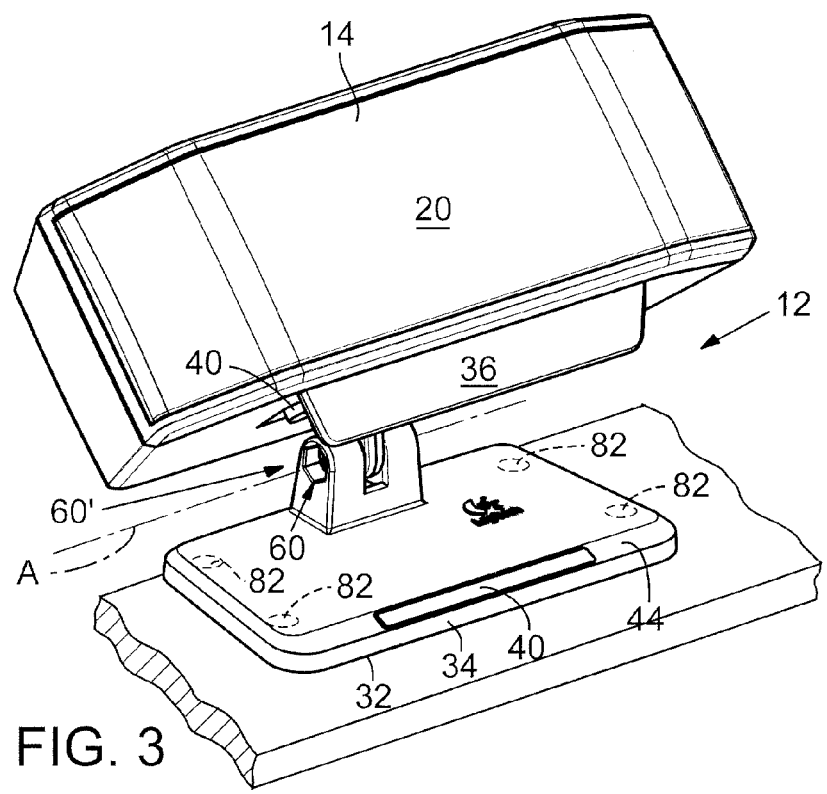
FIG. 3 is a front, left isometric view of the speaker with a flat panel monitor mounting stand, showing a possible position of the speaker resting on a substantially horizontal surface.
Figure 4:
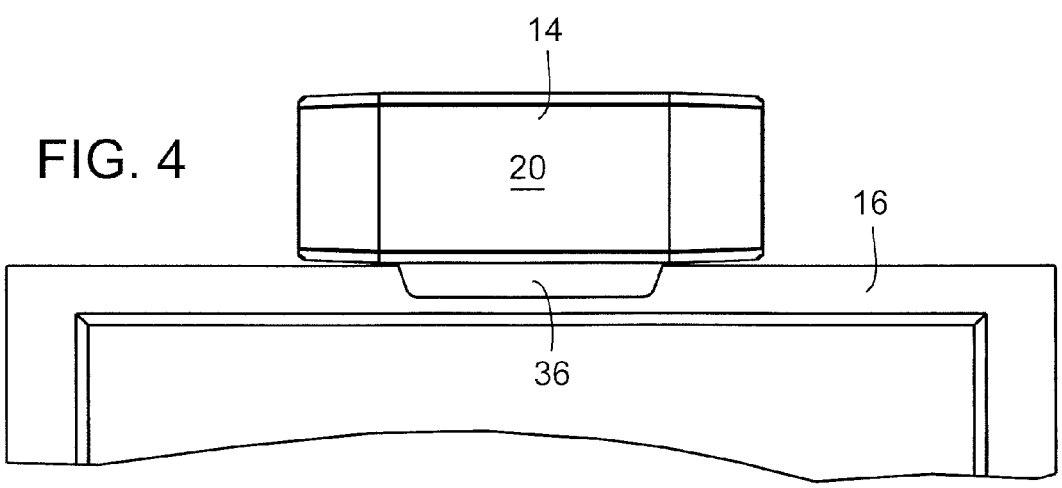
FIG. 4 is a front view of the speaker with stand of FIG. 1.

Referring to FIG. 3, the speaker system 10 has a speaker frame 20 that is preferably housing speaker components, such as driver(s), control circuitry, connectivity circuitry, power source and the like, thereby defining the speaker.

The mount 12 is pivotally secured to the speaker frame 20 at pivot A and has a base portion 30 with a substantially planar bottom surface 32 and a leading edge 34, preferably spaced apart from Pivot A. A monitor engaging lip 36 is spaced apart from pivot A and extends from the speaker frame 20 toward the base portion 30. The leading edge 34 of the base portion 30 moves toward and away from the engaging lip 36 about arrows B (FIG. 2) as the mount 12 is pivoted about pivot A.

Figure 1:
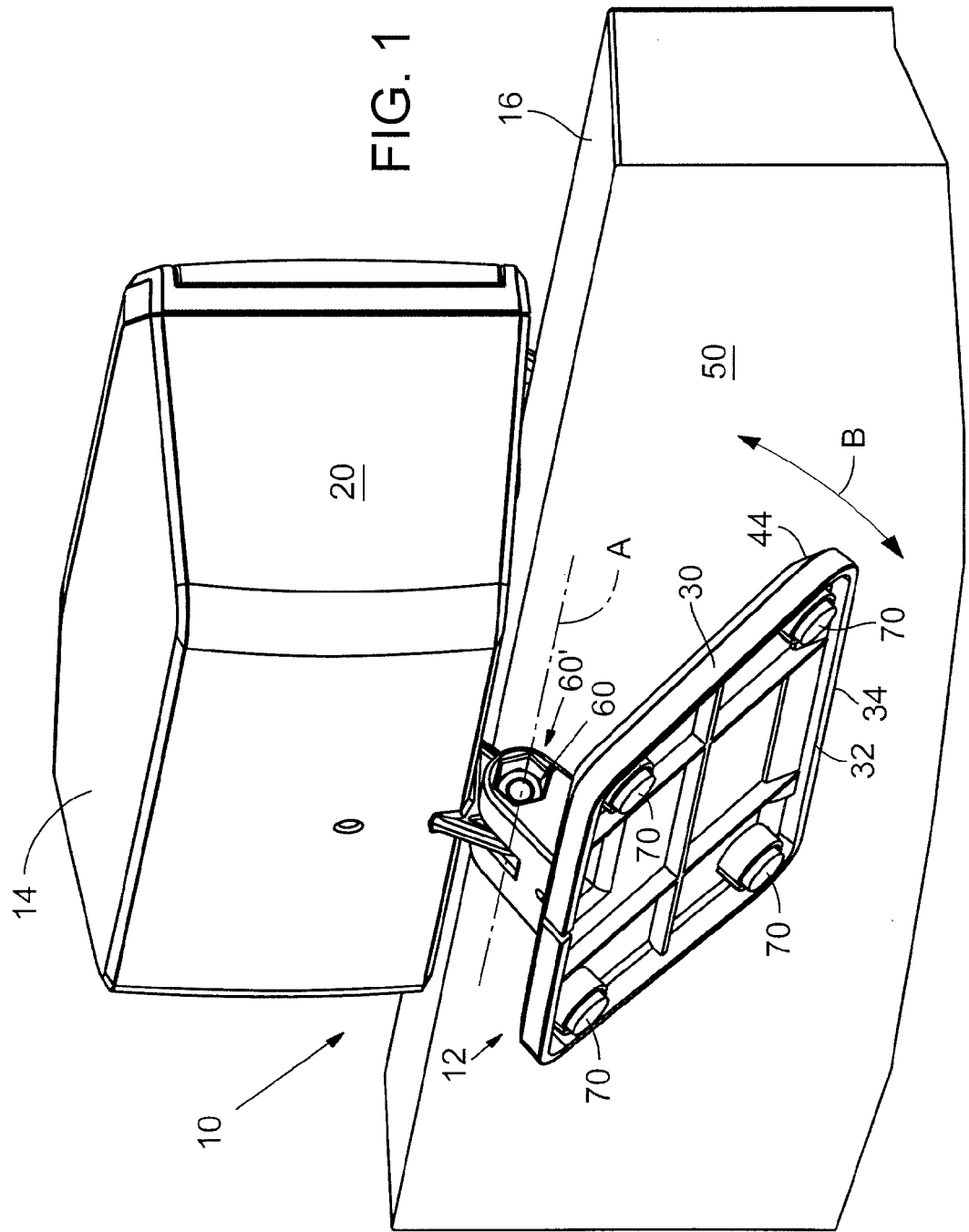
FIG. 1 is a rear, left, perspective view of a speaker with a flat panel monitor mounting stand showing a possible orientation on a flat panel monitor in accordance with an embodiment of the present invention.
Figure 2:
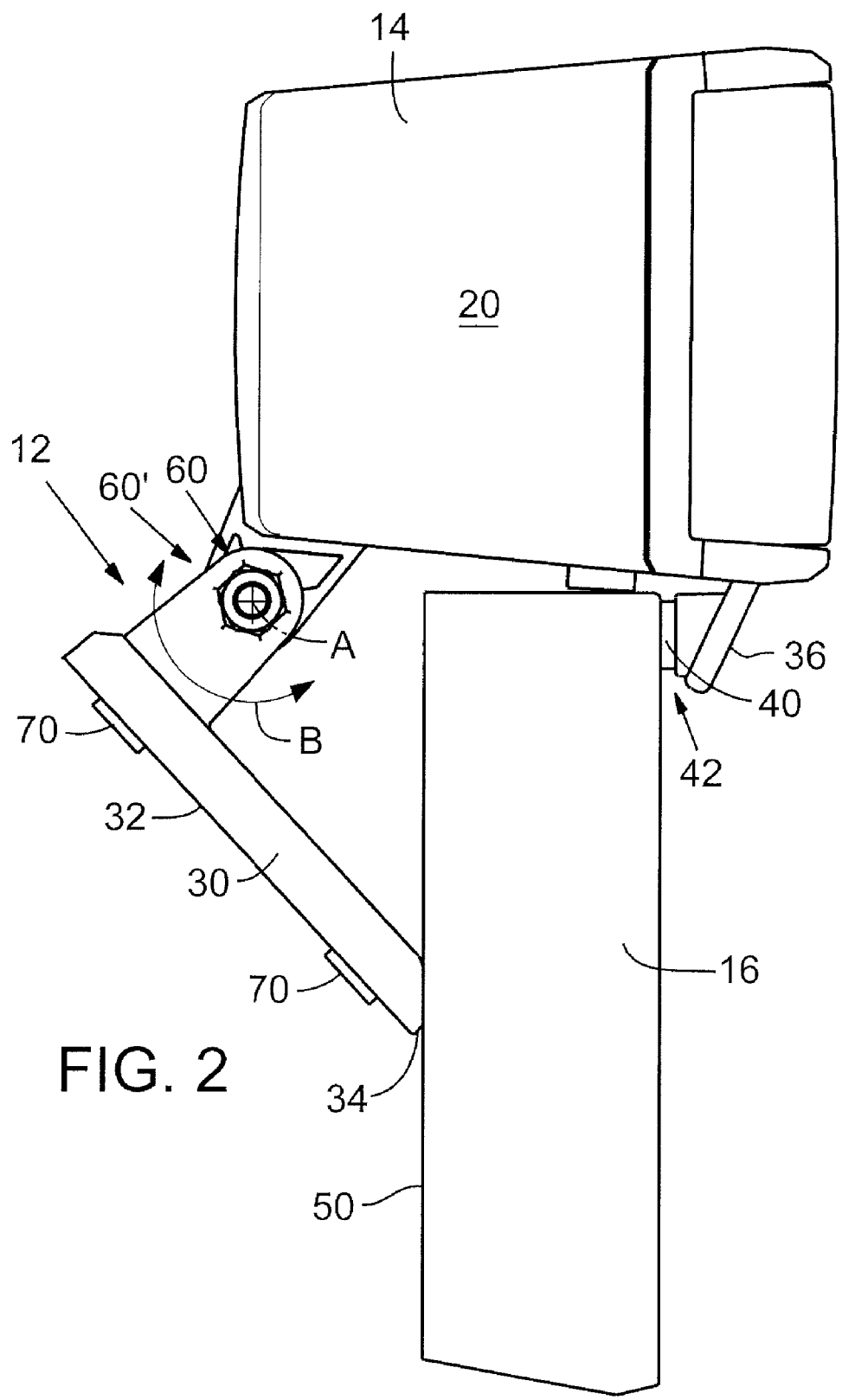
FIG. 2 is a left, side view of the speaker with stand of FIG. 1. The right, side view being a mirror image thereof.

Preferably, resilient monitor engaging pads 40 are provided on the inside surface 42 of the lip 36 and on the upper portion 44 of the leading edge 34 of the base portion 30. More preferably, the upper portion 44 of the leading edge 34 of the base portion 30 is also beveled relative to the bottom surface 32 of the base portion 30 so as to allow the upper portion 44 to operably engage the back surface 50 of the flat panel monitor 16 as shown in FIG. 2 with the inside surface 42 of the monitor engaging lip 36.

Preferably, a securing structure 60 holds the base portion 30 at a predetermined position relative to the lip 36 about Pivot A. In one preferred embodiment, the securing structure 60 is a conventional threaded bolt and nut assembly 60'. A user selects the desired position of the base portion 30 relative to the lip 36 and tightens the nut to the bolt. The bolt and/or nut can include thumb hold portions for allowing hand tightening and loosening of the bolt/nut as needed.

Alternatively, a biasing member (not shown) can urge the leading edge 34 of the base portion 30 toward the lip 36 to define a neutral position. A user then moves the base portion about pivot A away from the lip to position the monitor 16 therebetween. Releasing the base portion 30 urges the base portion 30 to return to its neutral position, thereby allowing the mount to clamp about the monitor 16 as shown in FIG. 2.

Preferably, resilient pads 70 are provided on the bottom surface 32 of the base portion 30 to prevent the speaker from sliding when placed on a substantially flat surface 80 as best shown in FIG. 3. If desired, mounting holes 82 can also extend through the base portion, preferably substantially perpendicular to the bottom surface 32. The holes 82 can be used to secure the speaker to a wall or the like.

It can be appreciated that the mount 12 for the speaker system 10 can be positioned so as to either hold the speaker 20 on a substantially planar surface, such as a desk or the like, as shown in FIG. 3, or used as shown in FIG. 2 to detachably hold the speaker 20 up of the desk by detachably securing the speaker 20 to the upper edge of a flat panel monitor or the like.

Having described and illustrated the principles of our invention with reference to a preferred embodiment thereof, it will be apparent that the invention can be modified in arrangement and detail without departing from such principles. In view of the many possible embodiments to which the principles may be put, it should be recognized that the detailed embodiment is illustrative only and should not be taken as limiting the scope of our invention. Accordingly, we claim as our invention all such modifications as may come within the scope and spirit of the following claims and equivalents thereto.

We claim:

1. A speaker system for detachably securing a speaker to a display monitor comprising:
    a speaker for housing speaker components therein, wherein the speaker for housing speaker components therein has a bottom portion with a front end and a back end;
    a mount pivotally secured to a back end corner of the bottom portion of the speaker for housing speaker components therein, defining a pivot, wherein said mount has a base portion with a substantially planar bottom surface and a surface for engaging the display monitor;
    a display monitor engaging lip operably extending from the front end of the bottom portion of the speaker for housing speaker components therein and spaced apart from said pivot such that said display monitor is positionable between said mount and said lip thereby detachably securing said speaker system to the display monitor; and
    wherein the surface for engaging the display monitor of the base portion is movable toward and away from the lip as the mount is pivoted around the pivot and wherein the surface for engaging the display monitor operably engages said display monitor when said speaker system is detachably secured to said display monitor.

2. The speaker system for detachably securing a speaker to a display monitor of claim 1, further including a securing structure for operably holding said mount against the computer monitor.

3. The speaker system for detachably securing a speaker to a display monitor of claim 2, wherein said securing structure is a conventional nut and bolt operably extending through said pivot.

4. The speaker system for detachably securing a speaker to a display monitor of claim 1, further including a resilient engaging pad operably secured between said lip and said display monitor.

5. The speaker system for detachably securing a speaker to a display monitor of claim 1, wherein said substantially planar bottom surface allows the speaker system to be positionable on a table by resting said substantially planar bottom surface of said mount on the table.

6. The speaker system for detachably securing a speaker to a display monitor of claim 1, further wherein said mount has at least one through hole operably extending therethrough.

7. The speaker system for detachably securing a speaker to a display monitor of claim 1, wherein the surface for engaging the display monitor comprises a leading edge and wherein a portion of said leading edge is beveled.

8. The speaker system for detachably securing a speaker to a display monitor of claim 7, further including a resilient pad operably secured to said portion of said leading edge.

9. The speaker system for detachably securing a speaker to a display monitor of claim 1, wherein said display monitor is a flat panel display monitor.

10. The speaker system for detachably securing a speaker to a display monitor of claim 1, wherein the speaker for housing speaker components therein is configured to rest on the display monitor.

11. The speaker system for detachably securing a speaker to a display monitor of claim 1, wherein the speaker components include at least one driver, control circuitry, connectivity circuitry, and a power source.

* * * * *